US010321288B2

(12) United States Patent
Saad et al.

(10) Patent No.: US 10,321,288 B2
(45) Date of Patent: Jun. 11, 2019

(54) METHOD FOR MANAGING APPLICATIONS IN A SECURE ELEMENT

(71) Applicant: GEMALTO SA, Meudon (FR)

(72) Inventors: Heimi Saad, Gemenos (FR); Valérie Gleize, Gemenos (FR); Fabien Courtiade, Gemenos (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/769,145

(22) PCT Filed: Sep. 15, 2016

(86) PCT No.: PCT/EP2016/071906
§ 371 (c)(1),
(2) Date: Apr. 18, 2018

(87) PCT Pub. No.: WO2017/067722
PCT Pub. Date: Apr. 27, 2017

(65) Prior Publication Data
US 2018/0310148 A1    Oct. 25, 2018

(30) Foreign Application Priority Data
Oct. 19, 2015  (EP) ..................................... 15306669

(51) Int. Cl.
*H04W 4/50*   (2018.01)
*H04W 4/60*   (2018.01)
(Continued)

(52) U.S. Cl.
CPC ............... *H04W 4/50* (2018.02); *H04W 4/60* (2018.02); *H04W 4/80* (2018.02); *G06F 8/61* (2013.01)

(58) Field of Classification Search
CPC ....... H04W 12/06; H04W 4/14; H04W 88/02; H04W 8/183; H04W 12/04; H04W 12/08;
(Continued)

(56) References Cited

U.S. PATENT DOCUMENTS

2010/0232386 A1* 9/2010 Dong .................... H04W 76/20
                                                                370/329
2014/0188713 A1   7/2014 Alimi
2016/0285493 A1* 9/2016 Veneroso ............. H04B 1/3816

OTHER PUBLICATIONS

International Search Report (PCT/ISA/210) dated Nov. 17, 2016, by the European Patent Office as the International Searching Authority for International Application No. PCT/EP2016/071906.
(Continued)

*Primary Examiner* — Kwasi Karikari
(74) *Attorney, Agent, or Firm* — Buchanan Ingersoll & Rooney PC

(57) ABSTRACT

The invention is a method for managing applications in a secure element comprising a communication interface. An application is installed in the secure element and configured to be implicitly selected on the communication interface. The method comprises the following steps: —the secure element receives a command requesting the installation of a new application configured to be implicitly selected on the communication interface, —upon receipt of the command, the secure element installs the new application, configures the new application to be implicitly selected on the communication interface and keeps the previous application unchanged.

7 Claims, 1 Drawing Sheet

(51) Int. Cl.
*H04W 4/80* (2018.01)
*G06F 8/61* (2018.01)

(58) Field of Classification Search
CPC ........... H04W 4/50; H04W 4/12; H04W 8/20; H04W 8/22
See application file for complete search history.

(56) References Cited

OTHER PUBLICATIONS

Written Opinion (PCT/ISA/237) dated Nov. 17, 2016, by the European Patent Office as the International Searching Authority for International Application No. PCT/EP2016/071906.

* cited by examiner

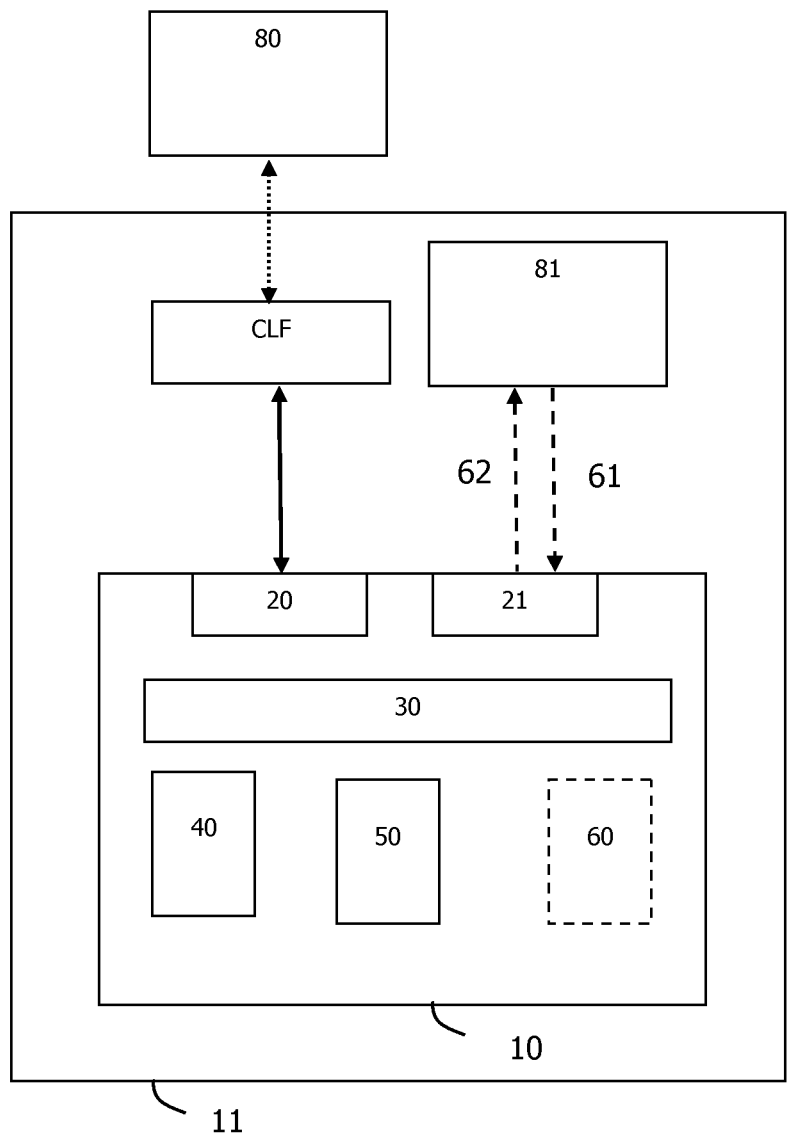

METHOD FOR MANAGING APPLICATIONS IN A SECURE ELEMENT

FIELD OF THE INVENTION

The present invention relates to methods of managing applications in secure elements. It relates particularly to methods relating to how the selection of an application is carried out.

BACKGROUND OF THE INVENTION

A secure element is a tamper-resistant device which is intended to be hosted in a machine like a mobile phone, a connected device, or any host machine requiring secure computing. A secure element may be removable like a Universal Integrated Circuit Card (UICC) or a secure memory card. A secure element is generally a hardware-based component. A secure element may be welded to its hosting machine. A secure element permanently associated with its host device is called embedded secure element. A secure element may contain an application intended to be called by the connected hosting machine or by a distant machine. A secure element may contain computing means (like cryptographic services) or a secure storage means intended to be used by the connected hosting machine.

A secure element can comprise several applications. To simplify access to applications, the principle of implicit selection has been defined. When an application is implicitly selected on a communication interface, an external device can send commands directly to the application, without to explicitly select the targeted application. For example, many deployed contactless readers in transport domain assume that the relevant application is already active and selected when starting a transaction with an application embedded in a secure element.

The GlobalPlatform Card specifications v2.2 defines the "Implicit Selection parameter" (tag 'CF' defined at § 11.1.7) allowing to declare an application as being implicitly selected for a contactless interface. Nevertheless, the GP 2.2—Amendment C v1.1.1 standard specifies that only one application can be installed with the "Implicit Selection parameter" for a communication interface.

It may happen that a user needs to have several applications of the same type in a secure element. For instance, when the user travels from city A to city B, he/she has to manually uninstall/unregister the current transport application corresponding to City A before installing the transport application relevant for accessing the urban transport network of City B with implicit selection settings. Such uninstall/install operations are long and may be complex. There are not convenient for a user.

There is a need to ease application management for applications needing to be implicitly selected and installed.

SUMMARY OF THE INVENTION

An object of the invention is to solve the above mentioned technical problem.

An object of the present invention is a secure element comprising an operating system and a communication interface. The operating system is configured to manage a plurality of applications which are simultaneously present and installed in the secure element and which are individually configured to be implicitly selected on the communication interface.

Advantageously, each of said applications may be individually activated and the operating system may be configured to deny a request of activation of one of said applications if another of said applications is already activated.

Advantageously, the operating system may be able to handle a command requesting both the installation of a new application configured to be implicitly selected on said communication interface and the activation of said new application. The operating system may be adapted to install said new application, to configure said new application so that it is implicitly selected on said communication interface and to deny the activation of said new application if one application of said plurality of applications is already activated.

Advantageously, the operating system may be adapted to send, in response to said command, a warning code reflecting the partial fulfillment of said command when the new application has been installed without activation.

Advantageously, said communication interface may be dedicated to communication targeting a contactless device.

Another object of the present invention is a method for managing applications in a secure element comprising a communication interface. A first application is installed in the secure element and is configured to be implicitly selected on said communication interface. The method comprises the steps:

the secure element receives a first command requesting the installation of a second application configured to be implicitly selected on the said communication interface, upon receipt of said first command, the secure element installs said second application, configures said second application to be implicitly selected on said communication interface and keeps said first application unchanged.

Advantageously, said first and second applications may be individually activated and said method may comprise the further step:

the secure element rejects an activation request of one of said applications if another of said applications is already activated.

Advantageously, said method may comprise the further steps:

the secure element receives a second command requesting both the installation of a third application configured to be implicitly selected on said communication interface and the activation of said third application, and upon receipt of said second command, the secure element installs said third application, configures said third application so that it is implicitly selected on said communication interface and denies the activation of said third application if one application configured to be implicitly selected on said communication interface is already activated.

BRIEF DESCRIPTION OF THE DRAWINGS

Other characteristics and advantages of the present invention will emerge more clearly from a reading of the following description of a number of preferred embodiments of the invention with reference to the corresponding accompanying drawing in which:

FIG. 1 depicts a system comprising a secure element according to the invention.

DETAILED DESCRIPTION OF THE PREFERRED EMBODIMENTS

The invention may apply to any type of secure element. In particular, the invention applies to removable secure elements and secure elements soldered to host devices. The invention applies to secure elements configured to be accessible via a NFC (Near Field Communication) channel. The invention is well-suited for applications in transit domain.

FIG. 1 illustrates the architecture of a secure element according to the invention.

The host device 11 is an NFC-enabled device (like a mobile phone or a wearable device for instance) comprising a NFC controller (named CLF) able to establish a NFC connection (shown as a dotted line) with the external device 80. The external device 80 may be a NFC reader. The host device 11 also comprises a communication component 81 able to establish OTA (Over-The-air) or HTTPS session with a remote machine, like a MNO (Mobile Network Operator) TSM (Trusted Service Manager) or SEI (Secure Element Issuer) TSM.

Alternatively, the NFC controller may be replaced with a RF router.

The secure element 10 is embedded in the host device 11. The secure element 10 includes several communication interfaces. The first communication interface 20 is connected to the NFC controller (or to the RF router) via a single wire and is able to exchange data with the CLF through the SWP protocol (Single Wire Protocol) as defined by ETSI TS 102 613 Release 7 and upper. The communication interface 20 can be considered as being dedicated to communication targeting a contactless device because it is linked to the NFC controller. The second communication interface 21 is connected to the communication component 81. The secure element 10 is configured to exchange data with the communication component 81 using SPI (Serial Peripheral interface) through the communication interface 21. In another example, the secure element 10 may be configured to communicate according to ISO7816 specifications through the communication interface 21.

In another example, the secure element 10 may have a unique communication interface.

The secure element 10 comprises an operating system 30. Two transport applications 40 and 50 are installed in the secure element 10. The operating system 30 is designed to allow installation of several applications as being implicitly selected on the same communication interface. For instance, applications 40 and 50 are individually configured to be implicitly selected on the first communication interface 20.

These applications 40 and 50 can be individually activated. When activated an application is able to receive a command, treat the command and generate a response. When disabled (i.e. not activated) an application cannot be triggered and treat any command.

The operating system 30 is designed to allow activation of applications. More specifically, the operating system 30 is configured to deny a request of activation of one application which his implicitly selected on a given communication interface if another application which his implicitly selected on the same communication interface is already activated.

For instance, if the application 40 is already activated, a request for activating the application 50 is rejected by the operating system 30. It is necessary to disable the application 40 before to successfully activate the application 50.

In another example, if there is no application already activated, a request for activating the application 50 is successfully performed by the operating system 30. For instance, the "CF" tag allocated to the application 50 is taken into account into associated installation/activation sequence accordingly.

It is to be noted that the application activation can be requested through the CRS (Contactless Registry Service) as defined by GlobalPlatform Amendment C v1.1.1.

As shown (in dashed line) at FIG. 1, the operating system 30 is able to handle a command 61 requesting both the installation of a new application configured to be implicitly selected on specified communication interface and the activation of this new application 60. The operating system 30 is adapted to install the application 60 and to configure the application 60 so that it is implicitly selected on the targeted communication interface. The operating system 30 is also configured to deny the activation of the application 60 if another application is both implicitly selected on the same communication interface and already activated.

For instance, let's assume that the application 40 is already activated and that the command 61 requests both the installation of the application 60 with settings specifying implicit selection on the communication interface 20 and the activation of application 60. The operating system 30 will install the application 60 and denies the activation of the application 60. In this case, the operating system 30 is configured to send a warning code 62 in response to the command 61. This warning code 62 reflects the partial fulfillment of the command 61. For instance, the warning code 62 may contain the value 0x6200.

The invention provides a way to manage possible conflicts due to the fact that only one application, which is implicitly selected on a given interface, can be activated at a time.

It is to be noted that two applications may be simultaneously active on the same interface: one application with the default selected parameter and the other one without the default selected parameter.

Advantageously, the secure element may comprise a proxy application (not drawn) which is the unique entry point associated with a communication interface. In this case, the proxy application is in charge of forwarding incoming commands to the targeted application. In this case, the applications reachable through the proxy application are managed according to the invention.

Case of Head/Member application shall be managed as defined in GlobalPlatform specifications vs activation and deactivation mechanism. Thus Head/member application, as defined in GlobalPlatform specifications are taken into account when it comes to Multi CF Tag.

Thanks to the invention, a user just has to deactivate the currently default selected application and activate the relevant one for accessing the needed service. This activation/deactivation can be performed through the conventional CRS (Contactless Registry Service) and CREL (Contactless Registry Event Listener) which are defined in GlobalPlatform specifications. There is no more need to uninstall/reinstall application.

Thanks to the invention, several applications can be installed in a secure element with the implicit selection on the same communication interface. No change in the deployed fleets of contactless readers is requested.

It must be understood, within the scope of the invention that the above-described embodiments are provided as non-limitative examples. In particular, the application may apply to any domain like payment, loyalty, Identity or service access. It may applies to applications corresponding to several countries, several markets or several business models. The secure element may contain any number of installed applications.

The invention is not limited to NFC communication interface and may apply to any possible RF communication interface.

The host device may be any device able to embed a secure element. For example, the host device may be a tablet, a car, a laptop, a smart watch, a wearable device or a computer.

The invention claimed is:

1. A secure element comprising:
   an operating system and a communication interface,
   wherein the operating system is configured to manage a plurality of applications which are simultaneously present and installed in the secure element and which are individually configured to be implicitly selected on said communication interface when activated, and wherein each of said applications is configured to be individually activated,
   wherein the operating system is configured to deny a request of activation of one of said applications if another of said applications is already activated and to perform the activation of the one application if none of said applications is already activated,
   wherein the operating system is configured to handle a command requesting both the installation of a new application configured to be implicitly selected on said communication interface and the activation of said new application, and
   wherein the operating system is configured to:
      install said new application,
      configure said new application so that said new application is implicitly selected on said communication interface when activated, and
      deny the activation of said new application if one application of said plurality of applications is already activated and perform said activation of said new application if none of said plurality of applications is already activated.

2. A secure element according to claim 1, wherein the operating system is configured to send, in response to said command, a warning code reflecting the partial fulfillment of said command when the new application has been installed without activation.

3. A secure element according to claim 1, wherein said communication interface is dedicated to communication targeting a contactless device.

4. A secure element according to claim 1, wherein said request of activation is performed through a Contactless Registry Service as defined by GlobalPlatform Amendment C v1.1.1.

5. A secure element according to claim 1, wherein each of said plurality of applications is individually configured to be implicitly selected as defined by the GlobalPlatform Card specifications.

6. A method for managing applications in a secure element comprising an operating system and a communication interface, wherein the operating system is configured to manage a plurality of applications which are simultaneously present and installed in the secure element and which are individually configured to be implicitly selected on said communication interface when activated, wherein each of said applications is configured to be individually activated, and wherein said method comprises the steps:
   the operating system receives a command requesting both the installation of a new application configured to be implicitly selected on said communication interface and the activation of said new application,
   the operating system installs said new application, configures said new application so that said new application is implicitly selected on said communication interface and denies the activation of said new application if one application of said plurality of applications is already activated and performs the activation of said new application if none of said plurality of applications is already activated.

7. A method according to claim 6, wherein said method comprises the further step:
   the secure element rejects an activation request of one of said applications if another of said applications is already activated and performs the activation if none of said applications is already activated.

* * * * *